United States Patent [19]

Kommoss

[11] Patent Number: 4,573,088
[45] Date of Patent: Feb. 25, 1986

[54] CONTROL DEVICE FOR THE TAPE DECK OF A MAGNETIC TAPE CASSETTE APPARATUS

[75] Inventor: Klaus Kommoss, Wetzlar-Naunheim, Fed. Rep. of Germany

[73] Assignee: U.S. Philips Corporation, New York, N.Y.

[21] Appl. No.: 499,129

[22] Filed: May 31, 1983

[30] Foreign Application Priority Data

Jun. 2, 1982 [DE] Fed. Rep. of Germany ....... 3220634
Apr. 30, 1983 [DE] Fed. Rep. of Germany ....... 3315822

[51] Int. Cl.⁴ .............................................. G11B 15/66
[52] U.S. Cl. ..................................................... 360/71
[58] Field of Search ....................... 360/71, 96.5, 96.6

[56] References Cited

U.S. PATENT DOCUMENTS

4,099,209 7/1978 Sander et al. .......................... 360/92
4,337,489 6/1982 Cicatelli .............................. 360/96.5
4,434,442 2/1984 Kommoss et al. .................. 360/74.2

Primary Examiner—George G. Stellar
Attorney, Agent, or Firm—David R. Treacy

[57] ABSTRACT

A mechanism for setting a tape deck to individual functions between the insertion of a cassette into the deck and ejection of the cassette, is driven by a servomechanism which positions and actuating rod in the direction of insertion. An actuating rod, which is movable in the direction of insertion, cooperates with a switching source which supplies switching commands corresponding to actuating rod positions to a control circuit, for controlling a servomotor which is part of the servomechanism for controlling the tape deck movements.

16 Claims, 18 Drawing Figures

CONTROL DEVICE FOR THE TAPE DECK OF A MAGNETIC TAPE CASSETTE APPARATUS

BACKGROUND OF THE INVENTION

The invention relates to a control device for the tape deck of a magnetic tape cassette apparatus, for controlling the tape deck functions including the loading and ejection of a cassette by means of a servo drive mechanism; and more particularly to such a device which comprises an actuating member which is movable by means of a servomotor and which mechanically sets the tape deck functions during its movement to specific operating positions.

In general servo drive mechanisms are used if a greater ease of operation is required, if mechanical push button mechanisms occupy too much space or, more broadly, if instead of manual actuation motor-assisted operation is required.

A control mechanism for controlling a predetermined sequence of functions in a tape cassette apparatus is disclosed in published German patent application No. 29 17 716, to which U.S. Pat. No. 4,337,489 corresponds. The control mechanism is provided with a servo drive which comprises a plurality of cam discs arranged on a spindle. These cam discs cooperate with separate follower levers, by means of which the cassette is pulled inwards and ejected, the cassette holder is lowered into the playing position, the head mounting plate is moved towards the cassette, and the drive wheels are set to their operating positions. This construction is comparatively bulky, because the follower levers occupy much space. Moreover, fast winding cannot be effected by the servo drive. However, the major drawback is that the control mechanism can carry out the individual operating functions in sequence only, and these functions cannot be interrupted, except for the playing mode. This results in a fixed operating sequence which is not flexible enough.

SUMMARY OF THE INVENTION

An object of the invention is to provide a control device for the tape deck of a magnetic tape cassette apparatus in which the functional parts are arranged as compactly as possible. Another object is to provide a control device which is capable of starting and stopping all the tape deck functions which may occur during operation.

According to the invention this object is achieved in that the actuating bracket or member is an axially movable actuating rod (hereinafter usually referred to simply as a rod, although preferably shaped as a bracket from a plate of material) which can be moved forwards and backwards in the direction of loading and ejection of the cassette by means of a reversible servo motor, the actuating rod cooperates with a switching source which supplies switching commands which mark the actuating rod positions to a control circuit, the control circuit sets the actuating bracket or rod to specific operating positions through a servomotor by means of electrically generated switching commands, in which positions the actuating rod mechanically sets the tape deck functions corresponding to the said operating positions.

The principal part of this control device is therefore the actuating rod which is moved by means of a servo drive mechanism, and in conjunction with the control circuit converts the electrical commands into mechanical movements for the selection of the tape deck functions. By means of the actuating rod, which is movable in the direction of cassette loading and ejection, it is possible to generate the mechanical actuating movements of the tape deck by a part which is arranged in the direct vicinity of the cassette holder and the head mounting plate. Moreover, the actuating rod enables the gear wheels for fast winding to be set directly to their operating positions.

In a further embodiment of the invention the switching source comprises a circuit board with contact tracks which cooperate with wiper contacts. The individual contact tracks are divided into contact segments and the transitions between the contact segments generate commands which are supplied to the control circuit for changing the sequence of operations. Such a switching source which is influenced by the actuating rod can readily be arranged parallel to this rod so as to obtain a flat and compact construction.

Alternatively, other constructions may be used for the switching source, such as a counting element.

In a further embodiment of the invention the movable actuating rod is provided with guide slots which are engaged by guide portions of a head mounting plate and a cassette lift and the guide portions, as they follow the moving guide slots, guide the head mounting plate and the cassette lift to the operating positions corresponding to the actuating rod positions.

In a further embodiment of the invention the circuit board is arranged at a fixed location on the apparatus and the wiper contacts are arranged on a slide member. Furthermore, after a cassette to be played has been inserted it is retained by a gripper, the slide member is guided on the actuating rod and is movable relative to the actuating rod against a retaining force in the direction of insertion, the switching source supplying the starting command to the control circuit at the end of the slide member movement.

In another embodiment of the invention a threaded spindle which is rotated by the servo motor is arranged parallel to the direction of movement of the actuating rod, by means of which spindle the actuating rod can be moved to its operating positions. Such a threaded spindle is self-locking and occupies a minimal space.

In a modification of this embodiment a pulse magnet revolves with the threaded spindle, whose pulses are detected by a Hall element which functions as switching source and are transferred to the control circuit, which can thus count the revolutions of the spindle. Such a pulse magnet in conjunction with a Hall element is very compact and is particularly suitable for cooperation with a control circuit in the form of a microprocessor.

In a further modification of this embodiment there is provided a stop which limits the movement of the actuating rod and which can be identified by the switching device as the end position mark of the actuating rod, to which all the actuating rod movements are referred. In the event of ambiguous operating positions, for example in the case of intermediate switching off this provides a reference for the actuating rod and the control circuit. Moreover, the direction of rotation of the servomotor can be reversed by means of the stop.

In another embodiment of the invention the actuating rod is provided with a guide surface by means of which a latching mechanism for the head mounting plate can be rendered operative and inoperative. This has the advantage that further servomechanisms of the tape deck can be controlled by the latching mechanism. There may be provided, for example, a locking magnet, which retains a latching lever in the operating position for the latching mechanism after said lever has been positioned by means of the guide surface. The advantage of this construction is that in a simple manner a stand-by position for the head mounting plate is obtained, in which position the pressure roller, which is arranged on the head mounting plate, is lifted off the capstan in the event of a power failure.

In a further embodiment of the invention the actuating rod is provided with an actuating stop which depending on its position actuates a fast wind mechanism.

Moreover, the actuating rod may comprise a stop edge which limits the movement of the head mounting plate towards the magnetic tape when a fast-wind function is carried out.

Embodiments of the invention will be described in more detail, by way of example, with reference to the drawing.

DESCRIPTION OF THE PREFERRED EMBODIMENTS

Figure 1:
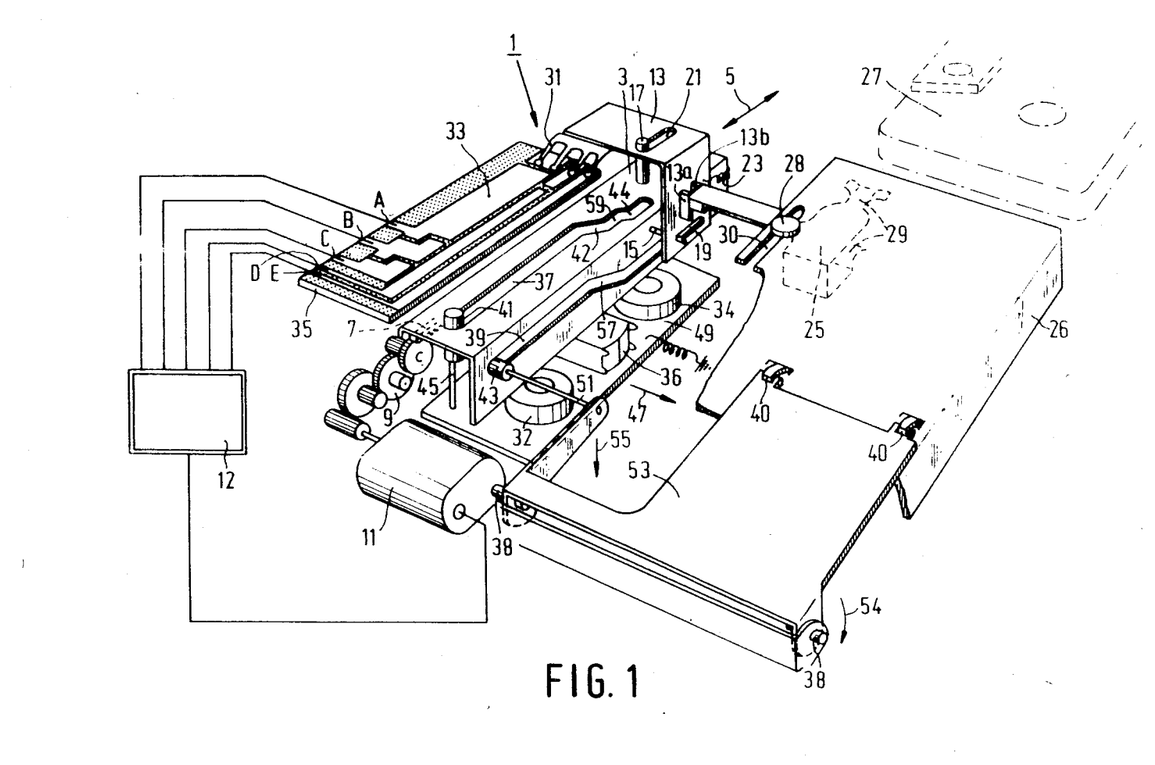
FIG. 1 is a perspective diagrammatic view of a control device for controlling the tape deck of a magnetic tape cassette apparatus with a servo drive and an electrical switching source, FIG. 2 consisting of A-D, is a switching diagram for the functional positions of the switching source of the control device shown in FIG. 1.

As is shown in FIG. 1 the tape deck of a magnetic tape cassette apparatus is provided with a control device 1, which controls all the movements in the deck from the loading movement of a cassette to the ejection of the cassette. The basic element of this control device is an actuating bracket or rod 3, which is arranged on the tape deck chassis so as to be movable in the axial directions indicated by a double arrow 5. The actuating rod 3 is provided with a gear rack 7 which cooperates with a reversible servo motor 11 through a gear mechanism 9. The drive motor 11 is electrically connected to a control circuit 12 and is capable of moving the actuating rod from the position shown in FIG. 1 to the left into an end position at the left and back to the starting position shown in FIG. 1. The control circuit 12 is also electrically connected to control buttons, not shown.

The transmission system with gear wheels and gear racks may be replaced by a mechanism comprising a threaded spindle which is flanged onto the motor shaft, and which cooperates with a threaded sleeve on the actuating rod. This construction provides a particularly effective and uniform self locking.

The actuating rod 3 cooperates with a slide member 13. This slide member 13 extends over the actuating rod 3 and is movable on the actuating rod 3 in the same plane of movement as this rod. For this purpose pins 15, 17 are secured to the actuating rod 3 and engage axial slots 19 and 21 in the slide member. A spring 23 between the slide member 13 and the actuating rod 3 pulls the member to the right in the drawing until the pins 15 and 17 abut with the left hand ends of the slots 19 and 21.

The slide member 13 cooperates with a gripper 25 into which a magnetic tape cassette can be inserted. Spring-loaded clamping arms 29 urge against the cassette 27 at the top and bottom and thereby retain it.

The gripper 25 is located inside a cassette holder 26 and carries a pin 28, which extends through a slot 30 in the cassette holder 26. The slot extends in the directions indicated by the double arrow 5. The gripper 25 is moved with the cassette holder 26 when this holder is moved back and forth. The gripper cooperates with the slide member 13 by means of parallel projection 13a, 13b. This enables the gripper 25 to move the slide member 13 when the gripper is manually shifted when a cassette is inserted. During the subsequent movement of the actuating rod 3 the projections take along the gripper 25 with the cassette 27.

The member 13 carries wiper contacts 31, 31a and 31b, which cooperate with contact tracks 33 on a circuit board 35 which is connected to the chassis. The individual tracks 33 are divided into contact segments A, B, C, D and E which are electrically connected to the control circuit 12. By providing wiper contacts 31a and 31b it is ensured that at least one of these wipers is in contact with the contact segments A, B, or C in order to preclude undefined intermediate positions.

The actuating rod is provided with guide slots 37, 39. When the actuating rod 3 is moved said guide slots 37 and 39 can move relative to guide rollers 41, 43 with which remain in the same position relative to the direction of the arrow 5. The guide roller 41 is connected through a rod 45 to the head-mounting plate 49 which is movable in the direction indicated by an arrow 47. The head mounting plate 49 carries pressure rollers 32 and 34 and a sound head 36. The guide roller 43, controls the pivotal movement of a cassette lift 53 through a spindle 51, in the direction indicated by an arrow 54. The cassette lift 53 is pivotable about spindles 38 mounted on the chassis. The lift 53 is also pivotally connected to the cassette holder 26 by means of spindles 40. By means of the lift 53 the cassette holder 26 can be lowered, in a manner not shown, in the direction indicated by the arrow 55, perpendicularly to the head mounting plate 49. The guide slots 37 and 39 in the angular actuating rod 3 are formed so that when the actuating rod 3 initially moved to the left the lift 53 is pivoted via an oblique portion 57 and the cassette holder 26 is consequently lowered, after which the head mounting plate 49 is moved towards the tape cassette by two oblique portions 42, 44. The roller travels between the oblique portions 42, 44 through a straight intermediate portion 59 of the guide slot 37.

Figure 2:
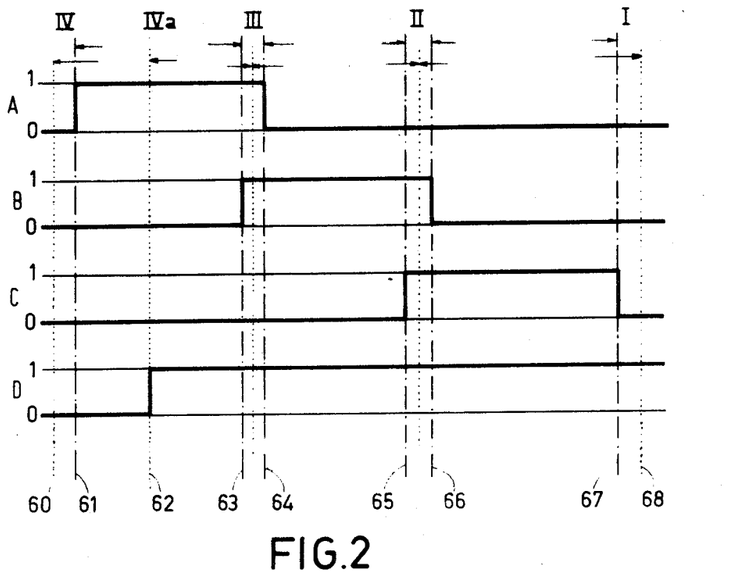

FIG. 2 is a switching diagram which represents the switching states and thus the supply of commands from the circuit board 33 to the associated tape deck control circuit. In the same way as in FIG. 1, the switching states of A, B, C and D are shown at the left. The Roman numerals I, II, III, IV and IVa at the top of the diagram indicate the functional positions.

For the individual positions and intermediate paths the diagram indicates whether the corresponding contact tracks are electrically connected to or disconnected from the continuous grounding track E through the wiper contacts 31. The phase in which no current flows via the path is designated 0 and the phase in which current flows is designated 1. When the actuating rod is moved from the position shown in FIG. 1 to the left there are intervals during which current flows in all four contact tracks A to D. The contact tracks each cooperate with wiper contacts 31 in such a way that the currents flowing in the ranges of the functional positions between IV and I result in function commands which are supplied to the control circuit of the tape deck. The functional positions are as follows:

Functional position IV means: Beginning of the ejection process (eject; this position is reached when the automatic ejection process has terminated). This position is represented in FIG. 1.

Functional position IVa means: Beginning of the loading process (load; this position is reached when the cassette has been inserted manually over a specific length).

Functional position III means: Fast winding and stand-by (fast forward; fast rewind; standby, that is, sound head and capstan roller lifted off the tape).

Functional position II means: MSS operative (music search system; in this position the sound head is still in contact with the tape but the pressure roller is lifted off).

Functional position I means: Play-back mode (play; sound head and capstan are positioned against the tape for normal operation).

The functional positions I to IV all cover a point where the motor is deenergized and the point where the servo drive has actually stopped. The point where the motor is de-energized is indicated by dash-dot lines, while the point where the servo drive has stopped is indicated by dotted lines. The arrows below the designations I to IV indicate in which directions the actuating rod 3 is moved. The intervals between a dash-dot line and a corresponding dotted line correspond to the over-travel of the servo drive between the de-energizing point and the actual stopping point. These intervals are substantially constant and are hardly longer than a few tens of millimeters, so that a correction is not necessary.

In FIG. 2 reference numerals are given near the functional positions. These numerals have the following meanings:
60=effective Eject (IV)
61=Eject indication (IV)
62=beginning of Load (IVa)
63=Fast or STB indication (III)
64=effective Fast or STB (III)
65=MSS indication (II)
66=effective MSS (II)
67=Play indication (I)
68=effective Play (I)

The letter designations have the following meanings:
FAST: Fast wind position. The commands for this are designated FFW fast forward or FRW fast rewind.
STB: Stand-by; this position is identical to FAST; the sound head 36 and the pressure rollers 32 34 are lifted.
MSS: Music Search System; in this position the pressure rollers 32, 34 are lifted and the sound head 36 is just in contact with the tape.
Play: Play position
Eject: Eject position
effective: The position which is effectively reached, because the servo drive does not stop immediately after switching off.
Indication: The position in which the function is selected and which is situated slightly before the "effective" position.

Figure 3:
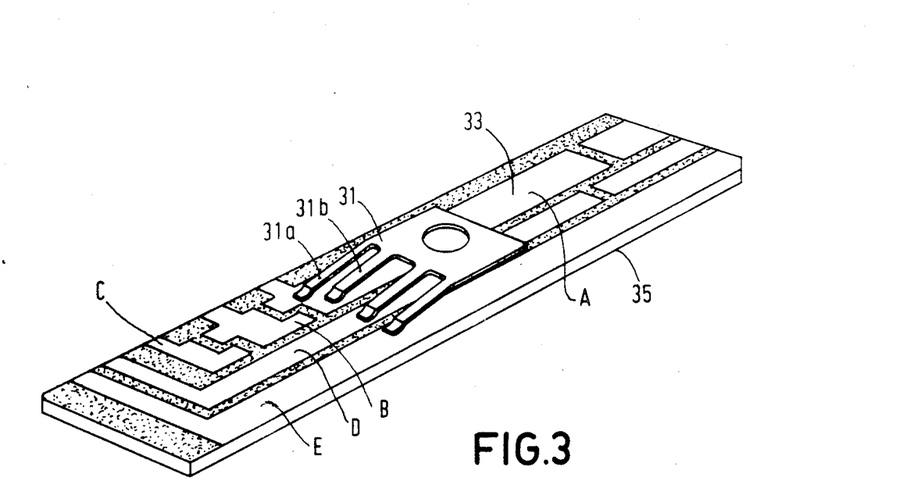
FIG. 3 is a perspective view of an electromechanical switching source comprising a circuit board provided with conductor tracks which cooperate with wiper contacts.
Figure 4:
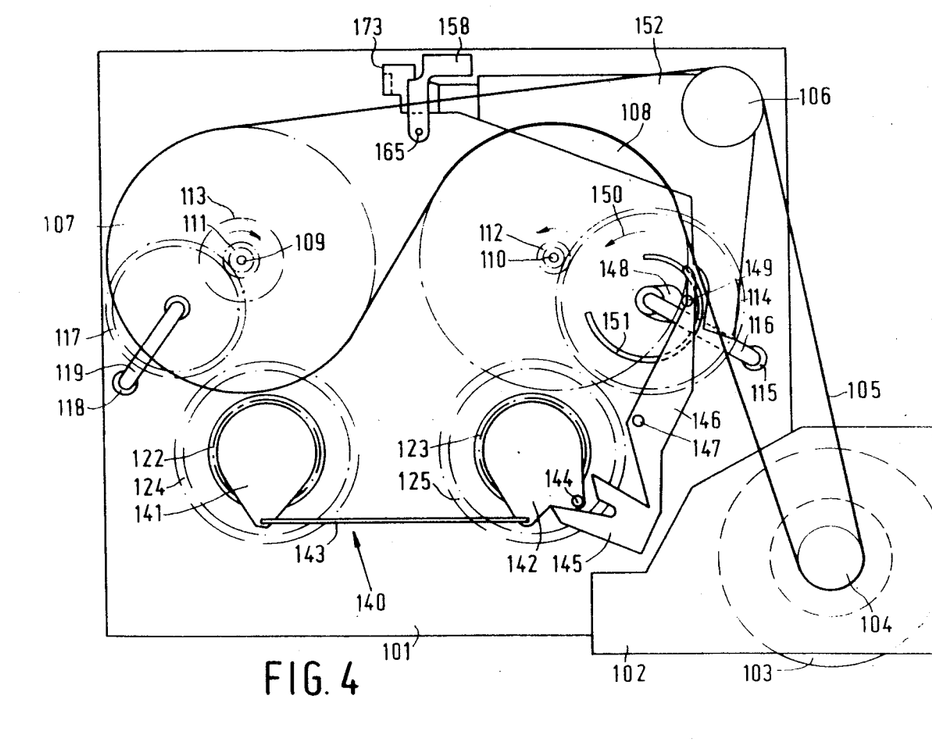
FIG. 4 is a bottom view of some parts of the magnetic tape cassette apparatus in another embodiment.

The operations of the control device follow this functional sequence. In the position shown in FIG. 1 the cassette 27 is inserted into the gripper 25. The slide member is manually urged to the left by the gripper 25 with a force which is greater than the force exerted by the retaining spring 23. During this movement to the left the contact wipers 31, as follows from FIGS. 2 and 3, are moved from position 60 to the right up to the dot line IVa (position 62). At this instant a current begins to flow in contact track D and a command supplied to the control circuit causes the control circuit 12 to start the servomotor 11.

If the apparatus is not switched on, that is, if no electric power is available, the servomotor cannot be started. Under the influence of the retaining spring 23 the cassette then returns to the initial position (position 60).

If the apparatus is switched on, the servo drive 11 remains operative, if no other commands are given by the control buttons, until the wiper 31 has left field C, that is, it reaches position I. The actuating rod 3 has then moved completely to the left, the roller 43 having passed the oblique portion 57. The cassette holder has now been lowered. Similarly, the roller 41 has passed the two oblique portions 42, 44, so that the head mounting plate 49 is moved forwards into the "Play" position. Depending on the direction of rotation of the tape deck one pressure roller on the head mounting plate 49 is more advanced and the other pressure roller is more withdrawn, in a manner not shown. This method of operation is described comprehensively in published German patent application No. 30 32 807, to which U.S. Pat. No. 4,434,442 corresponds. In this position (position 68), designated "Play", the tape deck is in its normal playback mode.

If one of the fast wind buttons is depressed, for example the command: FFW or FRW (fast forward and fast rewind) is given and the drive system 11 is started and proceeds to position III. The roller 41 has been returned by the oblique portions 44 and 42. The sound head 36 and the pressure rollers 32 and 34 are now clear of the tape. The roller 43 has not yet passed the oblique portion 57 and the cassette holder 26 is not yet lifted. In this position 64 fast winding of the tape is possible or the deck can be held in the stand-by position.

Position II has been provided for special functions. In position 66 the roller 41 is located in the intermediate portion 59 and the head mounting plate 49 has moved so far out of the play position that the head 36 just touches the tape but the rollers 32, 34 are no longer in contact with the tape. In this position fast winding is possible while it remains possible to pick a signal off the tape. In this position a music search system (MSS) can be obtained, in which the tape runds fast and silently until the apparatus detects the next modulation pause (music pause) and subsequently proceeds automatically to the play mode.

If by means of a button the "eject" command is given, the drive 11 returns until field A is left and position IV (position 60) is reached. The roller 41 has then passed the two oblique portions 44 and 42 and the roller 43 has passed the oblique portion 57. This means that the pins 15, 17 have moved the member 13 to the right, thereby taking along the gripper 25. The head mounting plate is now withdrawn completely and the cassette is lifted and ejected so far that it can be removed.

In a second embodiment of the invention the magnetic tape cassette apparatus, as shown in FIGS. 4 to 11, comprises a frame 101, which through a mounting plate 102 carries a drive motor 103 which rotates in one direction only. The drive pinion 104 of the motor 103 guides a belt 105, which is passed over the flywheels 107 and 108 by a roller 106 in such a way that the flywheels rotate in opposite directions. The flywheels 107 and 108 are mounted for rotation on the frame 101. The flywheel 107 is rigidly coupled to a capstan 109 and the flywheel 108 is rigidly coupled to a capstan 110. The flywheel 107 is also coupled to a gear wheel 111 and the flywheel 108 to a gear wheel 112. A further gear wheel 113 is rotatably journalled on the flywheel 108 through a slipping clutch, coaxially with the gearwheel 111. A switching wheel 114 in the form of a gear wheel is constantly in mesh with the gear wheel 112 on the flywheel 108. The gear wheel 114 is arranged to be pivotable about a spindle 115, which carries a pivotal arm 116, schematically shown in FIG. 4, on which the gear wheel 114 is mounted for rotation. In a similar way a gear wheel 117 is constantly in mesh with the gearwheel 111. This gear wheel 117 is arranged to be pivotable about a spindle 118 by means of a pivotal arm 119, which is shown schematically.

Figure 6:
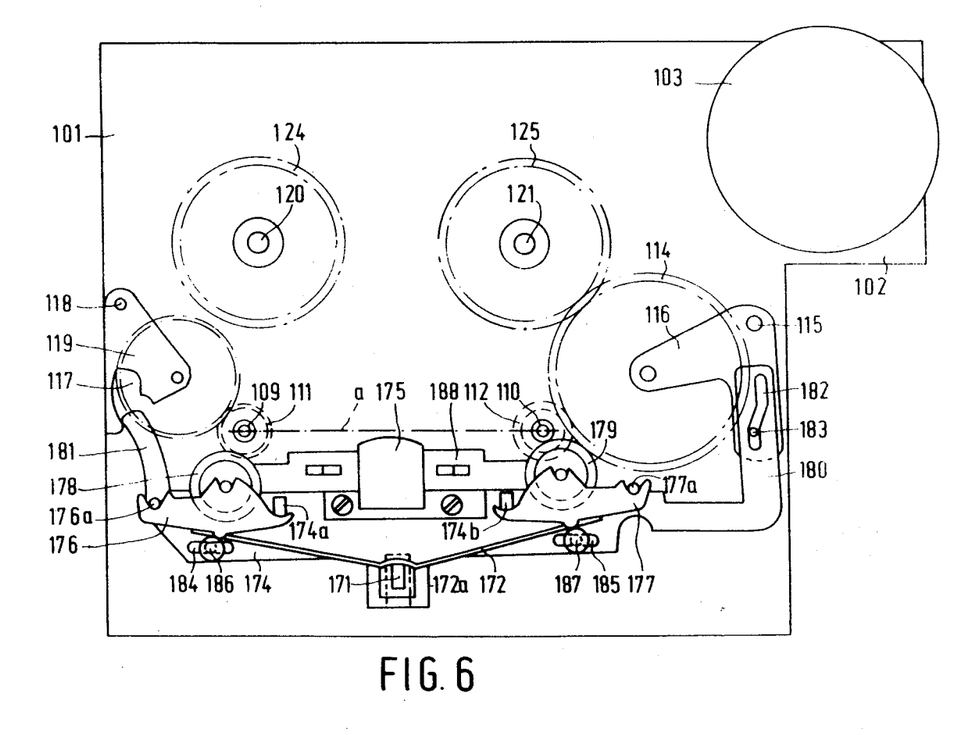
FIG. 6 is a plan view of some parts of the magnetic tape cassette apparatus shown in FIG. 4, viewed from the sound head side, in a play mode in a first direction of tape transport.
Figure 7:
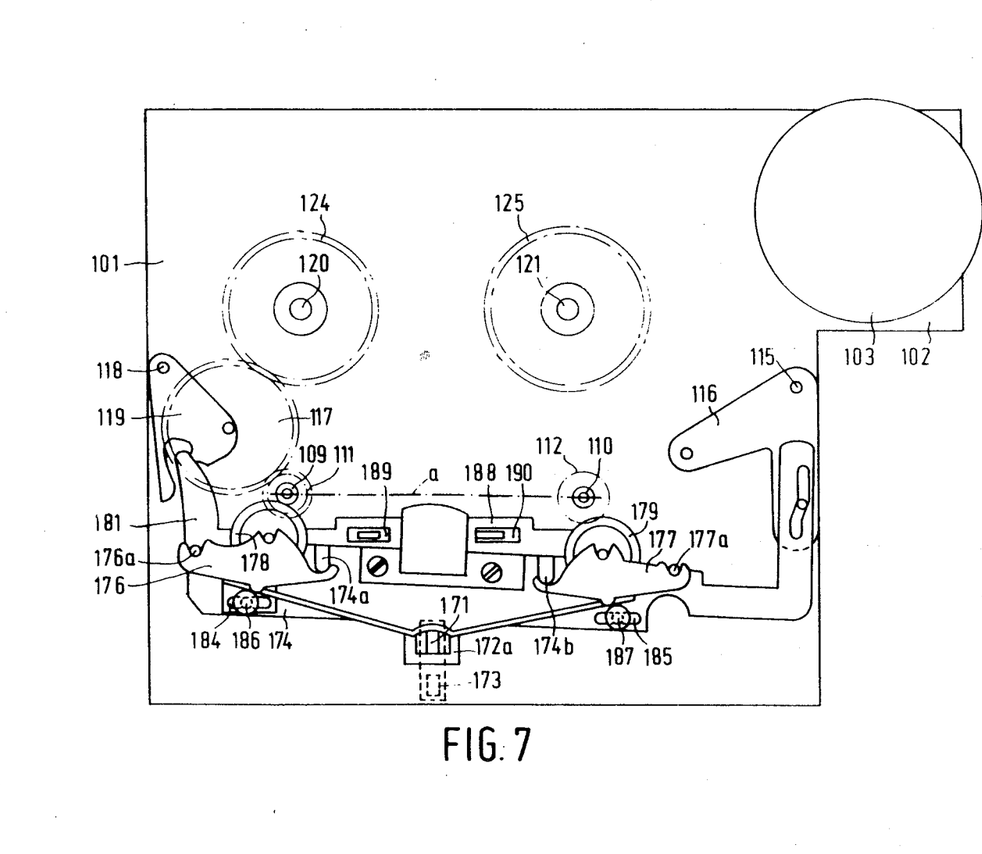
FIG. 7 is a plan view of some parts of a magnetic tape cassette apparatus as shown in FIG. 4, set for a tape transport direction opposite to that in FIG. 6.

As is shown in FIGS. 6 and 7 winding spindles 120 and 121 are rotatably journalled in the frame 101. These winding spindles 120, 121 are rigidly connected to fast wind wheels 122, 123. Play wheels 124, 125 are coupled by slipping clutches to the winding spindles 120, 121.

FIG. 6 shows how the play wheel 125 is driven by the gear wheel 112 through the switching wheel 114. In a similar way (FIG. 7) shows how the play wheel 124 is driven by the gear wheel 111 through the gear wheel 117.

A detection means 140, comprising two discs 141, 142 and a connecting rod 143, is connected to the winding spindles 120, 121 through slipping clutches. On the disc 142 a pin 144 is arranged which engages with a switching fork 145. The switching fork 145 is arranged on a switching member 146, which is pivotable about a pivot 147 (see also FIGS. 5A and 5B). The switching wheel 114 carries a central slightly elliptical projection 148. The switching member 146 extends over the switching wheel 114 and carries a pin 149 which, when the switching member 146 has pivoted inwards, can pass the projection 148 when the switching wheel is rotated in the direction indicated by an arrow 150. Around the projection 148 a spiral groove 151 is formed by a projection on the switching wheel 114. This groove 151 can cooperate with the pin 149 on the switching member 146, for example when the detection element detects tape stoppage. The pin 144 then no longer pushes against the switching fork 145, so that the pin 149 on the switching member 146 is no longer urged inwards towards the projection 148 but remains in the same position. As the switching wheel 114 continues to rotate in the direction indicated by the arrow 150, the pin 149 reaches the outer end of the groove 151. Since the groove 151 is spiral-shaped the switching member 146 will be pivoted clockwise (arrow 146a in FIGS. 5A, 5B) about its pivot 147, so that the switching member 146 is urged against a connecting member 152.

The connecting member 152 is a lever having two arms, which lever is pivotable about a pivot 153. As can be seen from FIGS. 5A and 5B the connecting member 152 is spring-biased in the clockwise direction by a spring 154. Thus, the movement of the switching member 146 tensions the spring 154.

The lever arm 155 of the connecting member 152 which is remote from the point of engagement with the switching member 146 carries a heart-shaped projection 156 which forms part of a latching mechanism 157. The latching mechanism 157 also comprises a latching lever 158, which is pivotable relative to the frame about the spindle 159. The spindle 159 extends parallel to the upper surface of the frame 101 and to an imaginary connecting line a between the capstans 109 and 110. The latching lever 158 also carries a guide pin 160 which extends through a hole 161 in the chassis 101. The pivotal movement of the latching lever about the spindle 159 will be explained hereinafter with reference to FIG. 10.

Figure 5:
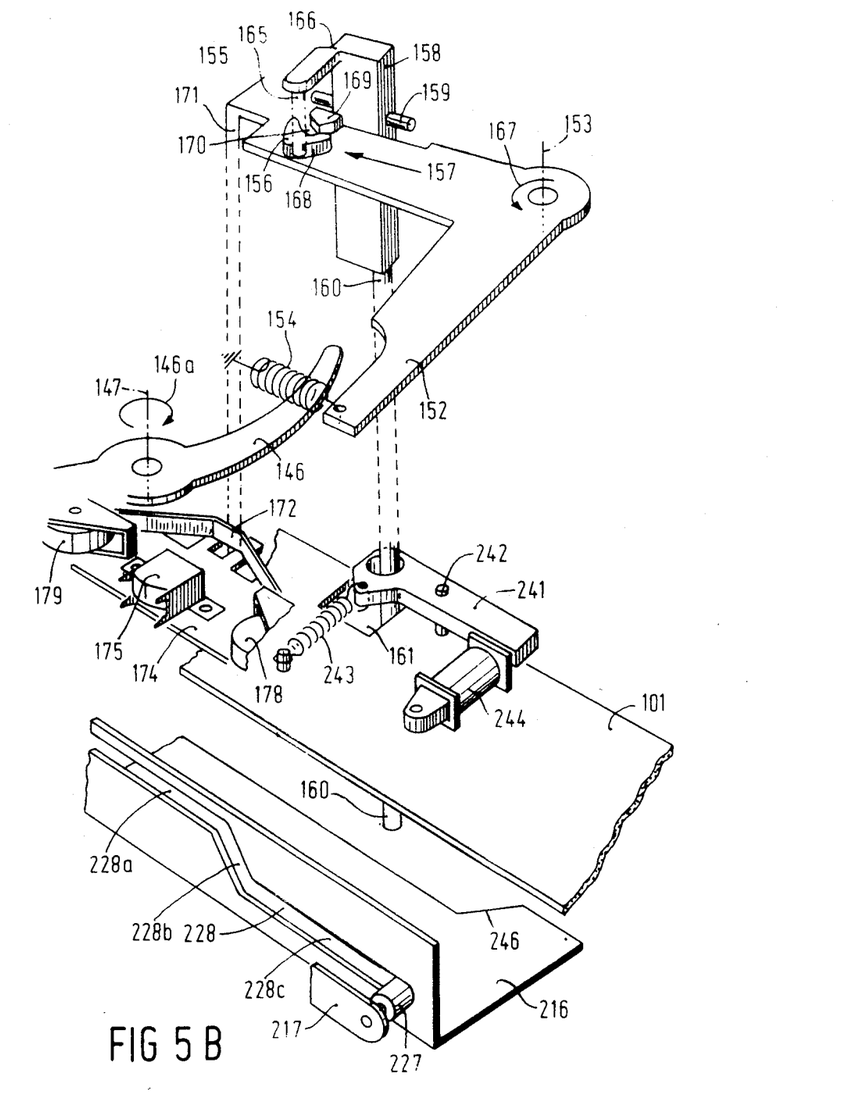
FIG. 5A is an exploded view of a latching mechanism of the apparatus shown in FIG. 4 in a first position on an enlarged scale.
FIG. 5B shows the latching mechanism of FIG. 5A in a second position.
Figure 5A:
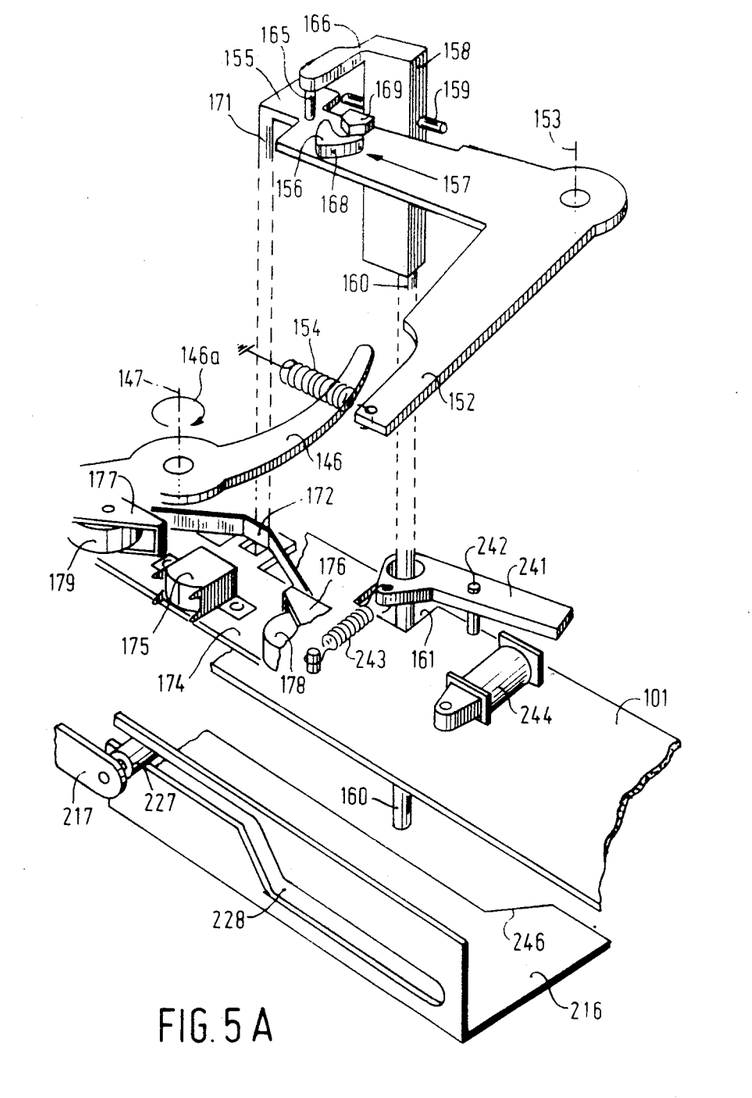

The latching lever 158 carries a latching pin 165, which can engage with and pass around the heartshaped projection 156. This is achieved for example via an integral hinge 166. In FIG. 5A the pin 165 is situated above the projection 156. In FIG. 5B the pin 165 is positioned against the projection 156. The pin 165 can then cooperate with the projection 156 if the switching member 146 pivots the connecting member 152 in the counter-clockwise direction indicated by the arrow 167, as shown in FIG. 5B. During this pivotal movement the pin 165 has passed a side wall 168 of the projection 156. A guide 169 ensures that the pin 165 engages with a recess of the heart-shaped projection 156.

The lever arm 155 carries a limb 161. As can be seen in FIGS. 6 and 7 this limb 161 cooperates with a plate spring 172 and extends through a slot 173 in the frame 101. With its free ends the plate spring 172 bears against members 176, 177 which are journalled and supported on a head mounting plate 174. This head mounting plate 174 carries an audio head 175 in its center; and on each side of the audio head 175, the plate 174 carries one of the members 176, 177 in which the pressure rollers 178, 179 are journalled. The members are urged against stops 174a, 174b on the head mounting plate 174.

The head mounting plate 174 has angular end portions 180, 181. The end portion 180 is formed with a slot 182 in which a pin 183 is movable, which pin is mounted on the pivotal arm 116. As a result of this, in the position shown in FIG. 6, the pivotal arm 116 has pivoted about the spindle 115 in such a way that the switching wheel 114 is in mesh with the play wheel 125 and the gear wheel 112. In a similar way FIG. 7 shows that the end portion 181 of the head mounting plate 174 has pivoted the pivotal arm 119 about the spindle 118, so that the gear wheel 117 is in mesh with the play wheel 124 and the gear wheel 111. Thus, in the position shown in FIG. 6 the pressure roller 179 is urged against the capstan 110; and in the position shown in FIG. 7 the pressure roller 178 is urged against the capstan 109.

In the head mounting plate 174 slots 184, 185 are formed parallel to the connecting line a between the capstans 109, 110, in which slots guide pins 186, 187 are movable.

Figure 8:
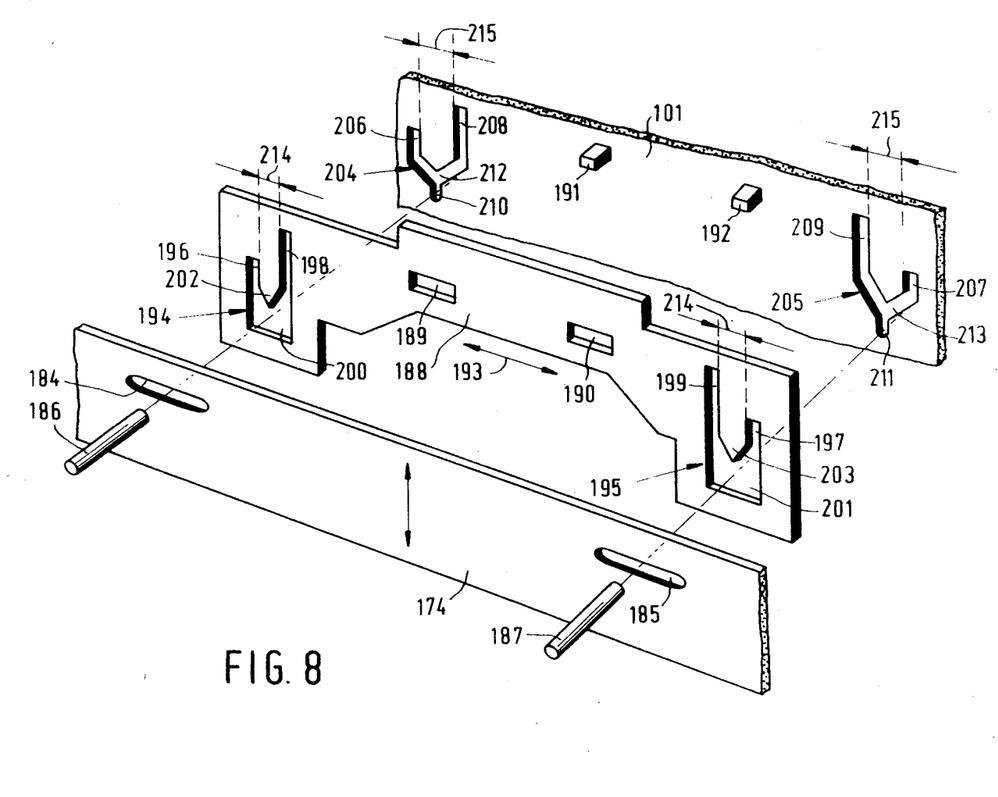
FIG. 8 is an exploded view which of a guide slot system in the apparatus shown in FIG. 4, set for changing over the tape transport direction and the head mounting plate, FIG. 9, consisting of A-D, show the various positions of a control plate for controlling the guide slot system and the head mounting plate shown in FIG. 8.

The exploded view in FIG. 8 shows the guide pins 186, 187 which are guided in the slots 184, 185 in the head-mounting plate 174. Thus, the guide pins can be moved parallel to the connecting line a between the capstans. How the guide pins 186, 187 are retained in the head mounting plate 174 is not shown in the drawings. A simple construction is to secure the guide pins to a cap in the same way as the pins of a thumbtack. However, alternatively the guide pins may be arranged on the free ends of resilient tongues which are secured to the headmounting plate 174.

A control plate 188 which serves as control means is arranged between the head mounting plate 174 and the chassis plate on the upper side of the frame 101. This control plate 188 is formed with longitudinal slots 189, 190 through which projecting guides 191, 192 on the chassis plate extend. As a result of this, the control plate 188 is movable parallel to the imaginary connecting line a between the capstans 109, 110. In FIG. 8 this movement is indicated by double arrow 193.

Near both ends the control plate 188 is formed with U-shaped slots 194, 195. The U-shaped slots 194 and 195 each have a short branch 196, 197 and a long branch 198, 199. The short branches are remote from each other and the long branches are disposed closer to each other. The connecting portions 201 and 202 between the short and the long branches are substantially wider. Between the long and short branches tongues 202 and 203 are formed, having pointed ends which face the connecting portions 200 and 201.

Fork-shaped guide slots 204 and 205, which constitute a guide slot system, are formed in the chassis plate of the frame 101. The slots 204, 205 each comprise two lateral branches corresponding to the two fork tines, of which one branch 206, 207 is shorter than the other branch 208, 209. A central run-in branch 210, 211 opens into the through-shaped fork base 212, 213. The distance 214 between the branches of the U-shaped guide slots 194, 195 in the control plate 188 is smaller than the distance 215 between the lateral branches of the fork-shaped guide slots 204, 205.

The head mounting plate is positioned as follows: when a cassette is inserted, the switch of the motor 203 is closed in the manner, not shown, and the motor is started. As a result of this, the flywheels 107 and 108 begin to rotate in opposite directions. At the same time the gearwheels 111 and 112 are rotated, so that the gear wheels 114 and 117, with which they are in mesh, are also rotated.

The latching lever 158 is pivoted out of the position shown in FIG. 5A about the spindle 159 by means of the mechanism to be described with reference to FIG. 10. The latching pin 175 is positioned against the heart-shaped projdction 156 (FIG. 5B).

As the gear wheels 114 and 117 are not in mesh with the gear wheels 124 and 125, the two winding spindles 120 and 121 are not driven. The discs 141 and 142 are coupled to the winding spindles 120, 121 through separate friction clutches and are therefore also stationary. Since no torque is extended on the switching member 146 when the cassette is inserted because the wheels do not rotate and there is no tape transport, the switching member 146 remains in the position shown in FIG. 4 and the pin 149 is moved to the end of the groove 151. As a result of this the switching member 146 is moved in the clockwise direction as indicated by the arrow 146a and the connecting member 152 is pivoted counterclockwise (arrow 167). Since the latching lever 158 has pivoted and the pin 165 is positioned against the projection 156, the pin 165 now travels along the wall 168 of the heart-shaped projection 156 and engages the recess 170. Thus, the connecting member is latched in a pivoted position (see FIG. 5B).

As a result of the pivotal movement of the connecting member 152 in the counterclockwise direction as indicated by the arrow 167, the limb 171 is moved inwards and is urged against the plate spring 172. The plate spring in its turn acts against the head mounting plate 174, through the members 176 and 177, and tends to urge the plate 174 towards the capstans 109, 110. Now the action of the control plate 188 manifests itself.

Prior to the pivotal movement of the limb 171 the head mounting plate 174 has moved away from the capstan. As a result of this the guide pins 186, 187 have engaged the run-in branches 210 and 211 (cf. FIG. 8). The control plate 188 has assumed the position shown in FIG. 9A. When the head-mounting plate 174 is moved towards the capstans 109, 110 the guide pins 186, 187 move forwards and abut with the left-hand sides of the tongues 202, 203 to run into the left-hand branches 206 and 209 of the fork-shaped guide slots 204, 205. When the guide pins 186, 187 enter the branches 206 and 209 these pins 186, 187 move the control plate 188 to the left, so that the branches 196, 206, and 199, 209 coincide. The left-hand guide pin 186 is then retained in the shorter branch whilst the right-hand guide pin 187 can move freely towards the capstan 110 (FIG. 6B). As a result of this, the advanced head mounting plate 174 swings forwards towards the right in such a way that the right-hand pressure roller 179 is applied to the right-hand capstan 110. The other capstan remains free. Consequently, the tape will run in the direction shown in FIG. 6.

When the end of tape is reached the tape stops. As a result of this, the switching member 146 with its pin 149 is again pivoted outwards in the clockwise direction. Consequently, the connecting member 152 is again pivoted counterclockwise (FIG. 5B) in the direction indicated by the arrow 167. During this movement the connecting member 152 is pivoted beyond the normal travel obtained in the case of its latched position. This overtravel is possible because the limb 171 acts against the plate spring 172 on the members 176, 177 on the head mounting plate 174 and thus has room for a movement towards the head mounting plate. During this overtravel the pin 175 leaves the recess 170 and the latching mechanism 157 is released. Under the action of the spring 154 the released connecting member 152 is now pivoted clockwise, so that the limb 171 moves outwards. In this position the head mounting plate has returned to an outward position and the guide pins 186, 187 again engage with the run-in branches 210 and 211. The control plate 188 remains in its last position. The tongues 202 and 203 are then still situated to the left relative to the center position of the branches 210 and 211 (FIG. 9C).

Now the reversing process begins. The switching wheel 114 continues to rotate. Since the head mounting plate 174 has moved backwards its end portion 180 has moved outwards and thereby pivoted the pivotal arm 116 in such a way that the switching wheel 114 is no longer in mesh with the play wheel 125. As a result of this, the play wheel 125 is no longer driven. The detection means 140 then detects tape stoppage. Again the switching member 146 is pivoted clockwise. The switching member 146 presses against the connecting member 152 and pivots the latter counterclockwise in the direction indicated by the arrow 167. As a result of this, the pin 175 again cooperates with the heart-shaped projection 156 and the pin finally engages the recess 170, thereby latching the connecting member 152. The limb 171 has now moved forward again and the head mounting plate 174 assumes the position shown in FIG. 7 after having moved forwards. The gear wheel 117 comes into mesh with the gear wheel 111 through the end portion 181 of the head mounting plate 174, and thus with the play wheel 124. In this position, as is shown in FIG. 7, the pressure roller 178 is applied to the capstan 109 and the tape is moved in the opposite direction.

Figure 9:
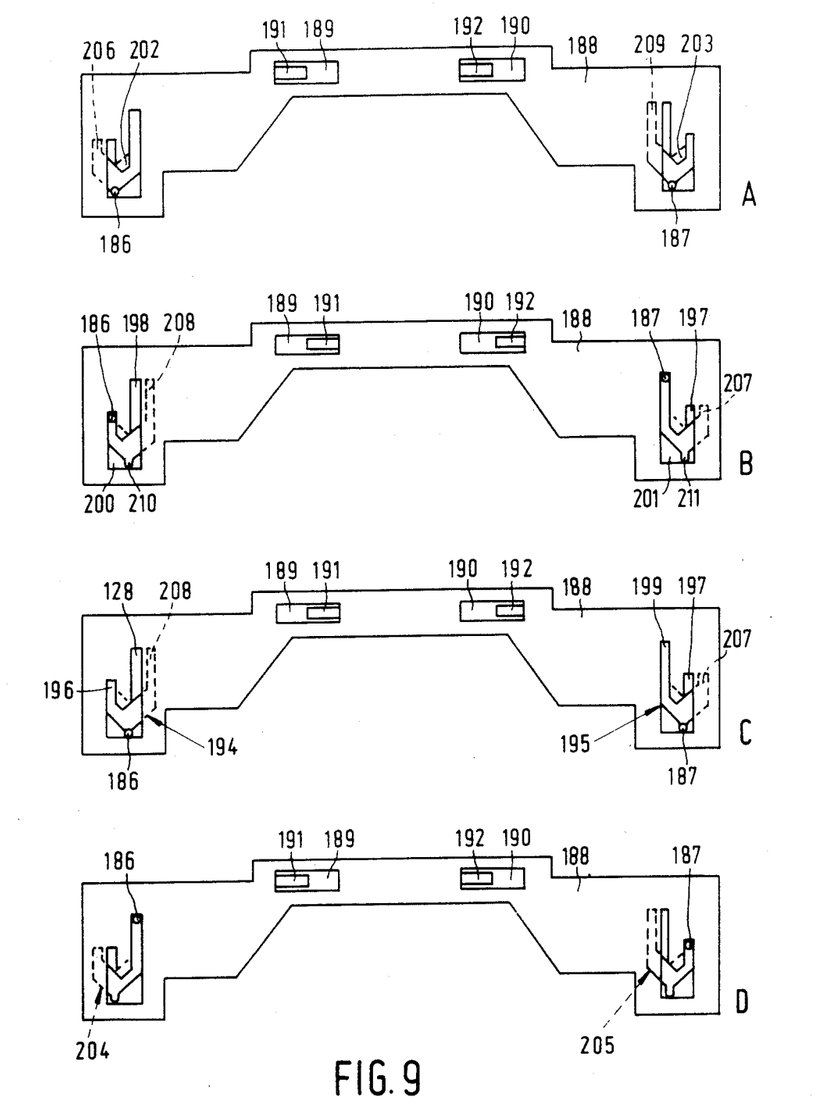

The reversal of the direction of tape transport is again effected by means of the system of guide slots, which is shown in various positions in FIG. 9. The last position described is the position shown in FIG. 9C. In this position the control plate 188 has been moved to the left and the guide pins 186, 187 engage the run-in branches 210 and 211. As a result of the forward movement of the head mounting plate 174 the guide pins 186, 187 are also moved forwards and abut with the right-hand oblique surfaces of the pointed tongues 202 and 203. Consequently, the guide pins 186, 187 are moved to the right and can move further into the branches 208 and 207. The transverse movement of the guide pins 186, 187 is possible by the sliding movement of the guide pins 186, 187 in the slots 184, 185. When the guide pins 186, 187 engage with the branches 207 and 208 these pins have moved the control plate 188 so far to the right that the branches 208, 198 and 207, 197 coincide. As a result of this, the tongues 202, 203 are positioned so that when the guide pins again move backwards and forwards they can abut with the left-hand oblique surfaces of the tongues 202 and 203. This position of the system of guide slots is shown in FIG. 9D. The guide pin 187 is retained in the shorter branches 207 and 197 during its forward movement, which prevents the head mounting plate 174 from moving further to the right. On the left-hand side the guide pin 186 can move freely in the branches 208 and 198, so far that the spring 172 on the left-hand side of the head mounting plate 174 can urge the pressure roller 178 against the capstan 109. This position is shown in FIG. 7.

Figure 10:
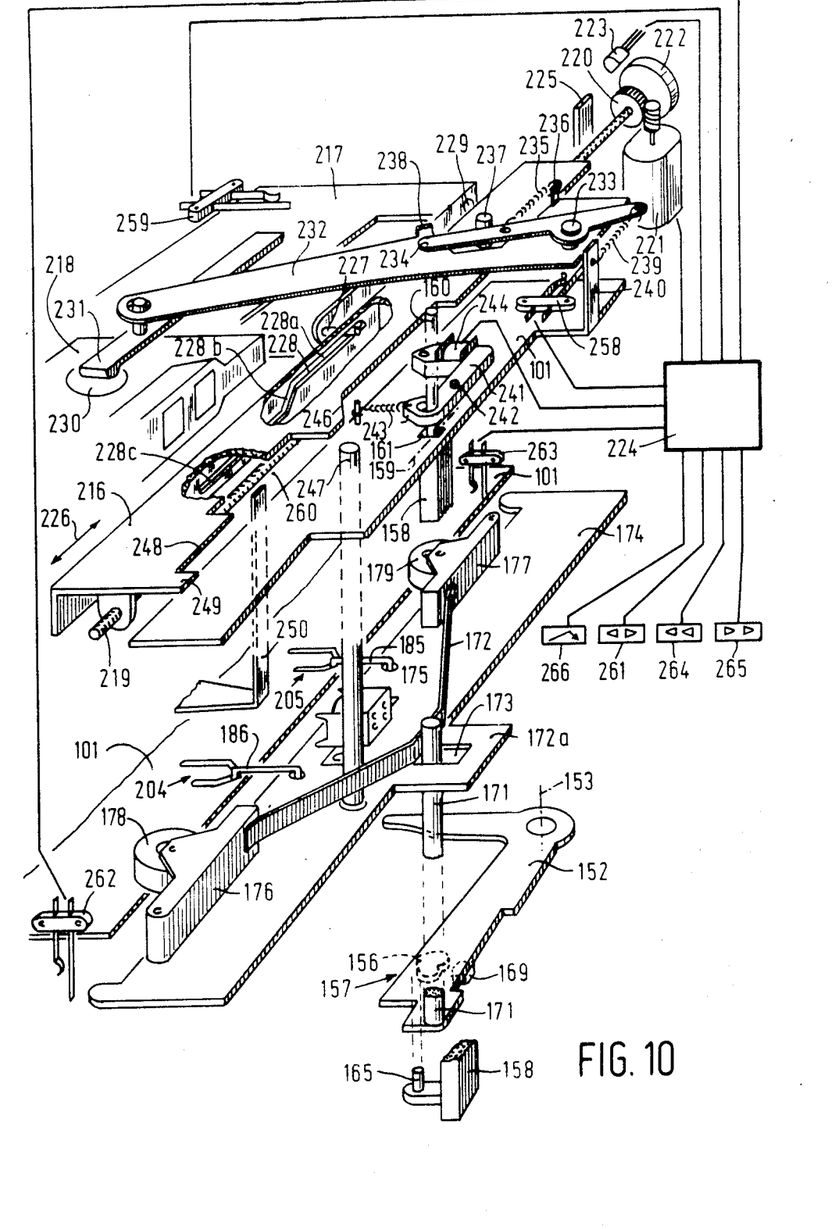
FIG. 10 is an exploded perspective view of the control device in the embodiment of the apparatus shown in FIGS. 4 to 9 with further schematically shown parts of the apparatus.

The servomechanism shown in FIG. 10 comprises an actuating bracket or rod 216, which is movable in the frame 101 adjacent a cassette lift 217 in the longitudinal direction. The longitudinal direction is the loading and ejection direction of the cassette 218. The actuating rod 216 is moved by means of a threaded spindle 219. This threaded spindle is driven through a worm gear 220 by a reversible servomotor 221. A bipolar magnet 222 is mounted on the threaded spindle 219. This magnet can set a Hall-effect IC 223, for example, a Texas Instruments type TL 172, to various switching states and thus control this IC. The Hall IC 223 is connected to a control circuit 224 which may be of any commercially available microprocessor type such as National Semiconductors type COP 322L. The servomotor 221 is also connected to the control circuit 224. A stop 225 on the frame 101 limits the travel of the actuating rod 216. The stop acts as a mark for the end position of the actuating rod 216 in the direction of a double arrow 226 to the switching device 224, to which position all actuating rod movements are referred.

The left 217 is guided in the vertical direction by means of a pin 227 via a guide slot 228 in the actuating rod 216. Moreover, the lift is pivotable relative to the frame about a spindle 229. A first portion 228a of the guide slot extends parallel to the chassis 101, then changes into a portion 228b which extends downwards and finally changes into a portion 228c which again extends parallel to the portion 228a and in the direction of movement of the actuating rod 216 as indicated by the double arrow 226.

A coupling member 231 engages with a winding spindle hole 230 in the cassette 218 as soon as the cassette has been inserted into the apparatus as far as said member. In this position the cassette still projects about 10 mm from the apparatus. The coupling member is pivotally connected to an ejector 232, which is mounted on a chassis 101 so as to be pivotable about a spindle 233. An auxiliary lever 234 is also pivotable about the spindle 233 above the ejector 232. This auxiliary lever 234 is spring-loaded by means of a tension spring 235 arranged between a hook 236 and the ejector 232. In the position shown in FIG. 10 the auxiliary lever 234 can be pulled against a pin 237 on the actuating rod 216. With its frontmost free end the auxiliary lever 234 can urge against an oblique surface 238 on the ejector 232. A further tension spring 239 on the other free end of the auxiliary lever 234 pulls the free end clockwise towards a hook 240 on the chassis 101.

The pin 160 on the latching lever 158 extends through the hole 161 and through a locking lever 241. The latching lever 241 is pivotable about a spindle 242 and is pivoted away from a locking magnet 244 by means of a spring 243. The pin 160 can cooperate with a guide surface 246. The locking magnet 244 is electrically connected to the control circuit 224.

A pin 247 arranged on the head mounting plate 174 can run against a stop edge 248 on the actuating rod 216. A further stop 249 on the actuating rod 216 cooperates with the lever 250, which actuates the fast wind mechanism shown in FIG. 11.

Figure 11:
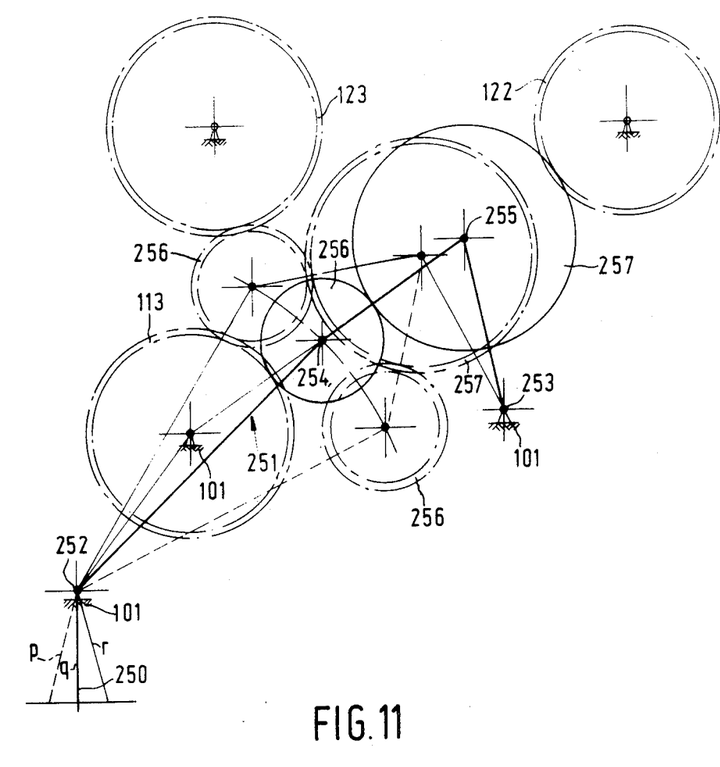
FIG. 11 is a mechanical diagram showing the fast-wind mechanism of the apparatus shown in FIGS. 4 to 10 in three different positions.

The fast winding mechanism shown in FIG. 11 cooperates with the fast wind wheels 122 and 123; it comprises a linkage 251. At its ends this linkage 251 is pivotally connected to the chassis 101 by pivots 252 and 253. The two other pivots 254 and 255 serve as journals for two drive wheels 256 and 257. The drive wheel 256 is smaller than the drive wheel 257. By means of a spring, not shown, the lever 250 is biased in such a way that it occupies the left-hand position p in the neutral situation. From this left-hand position p it can be pivoted to position r through position q, namely by means of the actuating rod 216, which acts against the lever 215 via the stop 249. In position p for the play mode the small gear wheel 256 is disengaged from the drive wheel 113. The gear wheel 257 is not in engagement with the fast wind wheels 122 and 123. In position q the small gear wheel 256 is in mesh with the gear wheel 113 and a gear wheel 257 is in mesh with the fast wind wheel 122. In this position the winding spindle 121 is driven with a higher speed. In position r the small gear wheel 256 couples the gear wheel 113 to the fast wind wheel 123. Thus, the winding spindle 120 is rotated with a higher speed.

When the cassette 218 is inserted into the apparatus and the coupling member 231 has engaged the winding spindle hole 230, the cassette is retained. Movement is now opposed by a distinct counter-force.

If the cassette 218 is inserted slightly further (approximately 2 mm) against the increasing counter-force, the ejector 232 is slightly pivoted about the spindle 233 and thereby closes an eject switch 258, which is connected to the control circuit 224. If the apparatus is electrically switched on the servo motor 221 is now started and the actuating rod 216 is moved to the right, as indicated by the double arrow 226, by the threaded spindle 219. The rotation of the threaded spindle 219 is detected by the Hall IC 223, thereby enabling the travel of the actuating rod to be measured by the control circuit 224. Thus, the pin 237 is also moved to the right and the auxiliary lever 234 can now pivot clockwise under the influence of the spring 239. The auxiliary lever 234 moves the ejector via the projection 238 in a clockwise direction, and the cassette 218 is moved inwards so far that a cassette switch 259 is closed. This switch is also connected to the control circuit 224 to preclude malfunctioning in the case of incorrect insertion of the cassette. If the two switches 258 and 259 are closed, the actuating rod 216 is moved further to the right and via the pin 227 and the guide surface 228 the lift is lowered. The actuating rod 216 then advances to the right until it abuts with the stop 225. In this position the guide surface 246 has urged the pin 160 to the right, so that the locking lever 241 is applied to the locking magnet 244. The locking magnet 244 is energized and now retains the locking lever 241. During this movement the latching lever 158 is also pivoted and the pin 165 has engaged the latching mechanism 157. Thus, the pin 165 can cooperate with the heart-shaped projection 156, Since the Hall-effect IC 223 receives no pulses the mechanical abutment of the actuating rod 216 with the stop 225 is detected, the spindle 219 being stationary. The servomotor 221 is now reversed by the control circuit 224 and is restarted in the opposite direction until a recess 260 is situated opposite the pin 247. This corresponds to the play position shown in FIG. 6 or 7. The drive motor 103 is now started under control of the control circuit 224. The winding spindles are still stationary and, as described with reference to FIG. 5B, the connecting member 152 is pivoted in the direction indicated by the arrow 167 and is latched in this pivotal position by means of the pin 165. During this pivotal movement in the direction of the arrow 167 the head mounting plate 174 is moved towards the magnetic tape and one of the pressure rollers 168 is applied to the corresponding capstan as described with reference to FIGS. 8 and 9. The tape transport is now started.

Starting is also possible in a different manner than described above by depressing a play button 261 which is electrically connected to the switching device 224 and which short-circuits the eject switch 258. As a result of this, the servo motor 221 is started in the same way as during automatic loading.

For the auto-reverse operation the tape stops when the end of tape is reached. The reversing operation is now initiated by means of the connecting member 152 and the control plate 188. During this reversing operation the head mounting plate 164 is withdrawn and advanced again, during which as described with reference to FIGS. 8 and 9 the pivotal position of the head mounting plate is changed, so that the previously non-driven reel hub is now driven. Alternatively, reversing is readily possibly by manual actuation in the normal play mode. For this purpose the locking magnet 244 is de-energized by briefly depressing the button 261 and the locking lever 141 is now released under the influence of the spring 243. Thus, the pin 160 is tilted to the left in the situation shown in FIG. 10. The latching mechanism 157 is then released and the pin 165 is moved away from this mechanism. This enables the head mounting plate 174 to be withdrawn. The tape deck motor 103 now stops until the servomotor 222 has moved the actuating rod 216 against the stop 225 and returned it to the play position. During this movement the guide surface 246 has again positioned the locking lever 241 against the locking magnet 244. The latching mechnism 157 is again actuated by the engagement of the pin 165. The control circuit 224 now starts the tape deck motor again. The connecting member 152 is also pivoted and the head mounting plate 174 is advanced. Thus, the tape transport direction is reversed by means of the control plate 188, as shown in FIG. 8.

Depending on the direction, one of the fast wind buttons 264, 265, which are electrically connected to the control circuit, is depressed for fast winding. Thus, the locking magnet 244 is de-energized by the control circuit 224. The servomotor 221 now moves the actuating rod 216 towards the stop 225 and back. During these movements the locking lever 241 is again retained by the re-energized locking magnet 244. As a result of this, the stop 249 moves the lever 250 into the corresponding fast wind position q or r in FIG. 11, depending on the position of the stop 249. The pin 247 then abuts with the projection 248 and ensures that the head mounting plate 174 cannot be advanced completely but remains in a position in which the pressure rollers 178, 179 are clear of the capstans. This position is also suitable for the rapid location of a specific passage on the magnetic tape. The control circuit 224 enables for this purpose to touch the buttons 264 and 265.

When an electrical eject button 266 is actuated the locking magnet 244 is de-energized and the locking lever 241 is released. The servomotor 221 moves the actuating rod 216 fully to the left, so that the pin 237 pivots the ejector 232 in the counterclockwise direction. The cassette 218 is thus moved outwards until the switch 258 opens.

There are provided two further switches 262 and 263 which can be actuated by the head mounting plate 164 depending on whether the head mounting plate 164 is in the pivotal position shown in FIG. 6 or 7. One of the two switches 262 or 263 is always closed and the corresponding tracks of the magnetic head 165 are operative.

If the two switches 258 and 259 are still closed when the apparatus is switched off and a cassette 218 is present, the control circuit 224 can detect the last tape transport direction selected when the apparatus is switched on again to start the tape transport in the correct direction. When the apparatus is switched on again, the control circuit 224 ensures that the actuating rod 216 is moved forwards to the stop 225 and then returns again to the playing position. The head mounting plate 174 is then advanced twice in the manner described with reference to FIGS. 8 and 9, so that the original play position is reached.

What is claimed is:

1. A control device for the tape deck of a magnetic tape cassette apparatus, for controlling tape deck functions including the loading and ejection of a cassette by means of a servo drive mechanism, said device comprising an actuating member and a servomotor for moving the actuating member, said actuating member mechanically setting the tape deck functions during movement to specific operating positions, characterized in that said servomotor is a reversible servomotor, and said actuating member is an axially movable actuating rod which can be moved forwards and backwards in the direction of loading and ejection of the cassette, the device includes a switching source and a control circuit, said switching source cooperating mechanically with said actuating rod to supply switching commands to said control circuit, which commands mark the actuating rod position, and the control circuit sets the actuating rod to specific operating positions by means of electrically generated switching commands to said servomotor, in said specific operating positions the actuating rod mechanically setting the tape deck functions corresponding to said operating positions.

2. A device as claimed in claim 1, characterized in that said switching source comprises a circuit board having individual contact tracks, and wiper contacts cooperating with said contact tracks.

3. A device as claimed in claim 2, characterized in that said individual contact tracks are divided into contact segments separated by transitions, cooperation of said wiper contacts with said contact segments and transitions generating commands which are supplied to the control circuit for changing the sequence of operations.

4. A device as claimed in claim 2, characterized by comprising a movable slide member on which said wiper contacts are arranged, said circuit board being disposed at a fixed location on the cassette apparatus.

5. A device as claimed in claim 1, characterized in that said switching source comprises a counting element.

6. A device as claimed in any one of claims 1-5, characterized by comprising gripper means for retaining a cassette which has been inserted, retaining spring means for biasing said slide member relative to the actuating rod in a direction opposite the direction of insertion, said slide member being guided on said actuating rod, and in that said switching source supplies a starting command to the control circuit at the end of the slide member movement.

7. A device as claimed in claim 1, 2, 3 or 5, characterized by comprising a threaded spindle disposed parellel to the direction of movement of the actuating rod, means for coupling said servomotor to said spindle for rotating said threaded spindle, and means for coupling the actuating rod to said spindle for moving said rod to its operating positions.

8. A device as claimed in claim 7, characterized by comprising a magnet mounted to revolve with said threaded spindle, a Hall-effect element disclosed to detect rotation of the field of said magnet, said Hall-effect element functioning as said switching source, signals corresponding to field detections by said Hall-effect element being transferred to said control circuit for counting revolutions of the spindle.

9. A device as claimed in claim 8, characterized by comprising a stop arranged to limit movement of the actuating rod, and means for identifying said stop as an end position mark of the actuating rod, said means for identifying cooperating with said switching device, all movements of said actuating rod being referred to said end position mark.

10. A device as claimed in claim 9, characterized in that said actuating rod comprises a guide surface, and said apparatus comprises a head mounting plate and a mechanism for latching the head mounting plate, said latching mechanism cooperating with said guide surface to render the latching mechanism operative and inoperative.

11. A device as claimed in claim 10, characterized in that said latching mechanism comprises a latching lever which is positioned by said guide surface, and the device comprises a locking magnet for retaining said latching lever in the operating position of the latching mechanism after said guide surface has positioned said lever.

12. A device as claimed in claim 11, characterized in that said actuating rod comprises an actuating stop, and the apparatus comprises a fast wind mechanism, and means for actuating said fast wind mechanism responsive to the position of said actuating stop.

13. A device as claimed in claim 12, characterized in that said actuating rod comprises a stop edge arranged to limit movement of the head mounting plate toward a magnetic tape in an inserted cassette when a fast wind function is being performed.

14. A device as claimed in claim 7, characterized in that said actuating rod comprises an actuating stop, and the apparatus comprises a fast wind mechanism, and means for actuating said fast wind mechanism responsive to the position of said actuating stop.

15. A device as claimed in claim 7, characterized in that said actuating rod comprises a guide surface, and said apparatus comprises a head mounting plate and a mechanism for latching the head mounting plate, said latching mechanism cooperating with said guide surface to render the latching mechanism operative and inoperative.

16. A device as claimed in claim 15, characterized in that said latching mechanism comprises a latching lever which is positioned by said guide surface, and the device comprises a locking magnet for retaining said latching lever in the operating position of the latching mechanism after said guide surface has positioned said lever.

* * * * *